(12) United States Patent
Tokumaru

(10) Patent No.: US 8,430,330 B1
(45) Date of Patent: Apr. 30, 2013

(54) APPARATUS HANDLING CODES, METHOD FOR CONTROLLING THE SAME AND PROGRAM

(71) Applicant: Canon Kabushiki Kaisha, Tokyo (JP)

(72) Inventor: Akiko Tokumaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/741,746

(22) Filed: Jan. 15, 2013

Related U.S. Application Data

(63) Continuation of application No. 12/630,415, filed on Dec. 3, 2009, now Pat. No. 8,371,511.

(30) Foreign Application Priority Data

Dec. 4, 2008 (JP) .................................. 2008-309963

(51) Int. Cl.
*G06K 19/06* (2006.01)
(52) U.S. Cl.
USPC ............................ 235/494; 347/107; 382/232

(58) Field of Classification Search ................... 235/494; 347/107; 382/232
See application file for complete search history.

(56) References Cited

U.S. PATENT DOCUMENTS

2008/0080777 A1* 4/2008 Tomita .......................... 382/232
2012/0111935 A1* 5/2012 Seo ............................... 235/375

* cited by examiner

*Primary Examiner* — Allyson Trail
(74) *Attorney, Agent, or Firm* — Canon USA, Inc., IP Division

(57) ABSTRACT

An apparatus for reducing a first document image and a second document image in a size and producing output images on a single sheet, the apparatus including: a creating unit configured to create a code containing information with a higher security level selected from first information contained in a code of the first document image and second information contained in a code of the second document image; and a unit configured to add the code created by the creating unit to the output image.

28 Claims, 10 Drawing Sheets

FIG.3

| Security: | copy_ok |
|---|---|
| Vendor: | GUAN YIN |
| Serial No: | 472942205918 |
| User Name: | David Janegal |
| Time: | 2008/09/21 14:33 |

| Code status: | 1/2 |
|---|---|
| Security: | password |
| Vendor: | GUAN YIN |
| Serial No: | 472942205918 |

| Code status: | 2/2 |
|---|---|
| User Name: | David Janegal |
| Time: | 2008/09/21 14:33 |

APPARATUS HANDLING CODES, METHOD FOR CONTROLLING THE SAME AND PROGRAM

CROSS REFERENCE OF RELATED APPLICATIONS

This application is a Continuation of U.S. patent application Ser. No. 12/630,415 filed on Dec. 3, 2009 which claims the benefit of Japanese Application No. 2008-309963 filed Dec. 4, 2008, which is hereby incorporated by reference herein in its entirety.

BACKGROUND OF THE INVENTION

1. Field of the Invention

The present invention relates to an apparatus handling codes, a method for controlling the apparatus and a program.

2. Description of the Related Art

Japanese Patent Application Laid-Open No. 2006-259045 discusses a method in which even when documents containing codes are copied at an N-up setting, the documents can be combined and printed such that the codes can be decoded later.

More specifically, in the Japanese Patent Application Laid-Open No. 2006-259045, while the sizes of the document images are reduced as illustrated in the representative drawing, the codes of original size are printed as they are in such a manner that the codes can be decoded later.

However, if the two codes contained in two original documents are included in one sheet while retaining the original size, the area available for printing information other than these codes is considerably reduced. This may degrade the visibility of the information (e.g., document images) other than the codes.

To address such a problem, it is desired to create a single code whose area is smaller than the total area of the two codes contained in two original documents and add the single code to the documents, or to create a plurality of smaller codes whose total area is smaller than the original two codes, and add these codes to the documents. It is also desired to delete a part of the information contained in the codes as a result of the decrease in code size.

SUMMARY OF THE INVENTION

According to an aspect of the present invention, an apparatus for reducing a first-document image and a second-document image in a size includes: a creating unit configured to create a code containing information with a higher security level selected from among first information contained in a code of the first document image and second information contained in a code of the second-document image; and a unit configured to add the created code to the reduced document images to produce an output.

Further features and aspects of the present invention will become apparent from the following detailed description of an exemplary embodiment and other embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a tag of a two-dimensional code according to the first exemplary embodiment.

DESCRIPTION OF THE EMBODIMENTS

Various exemplary embodiments, features, and aspects of the invention will be described in detail below with reference to the drawings.

Figure 1:
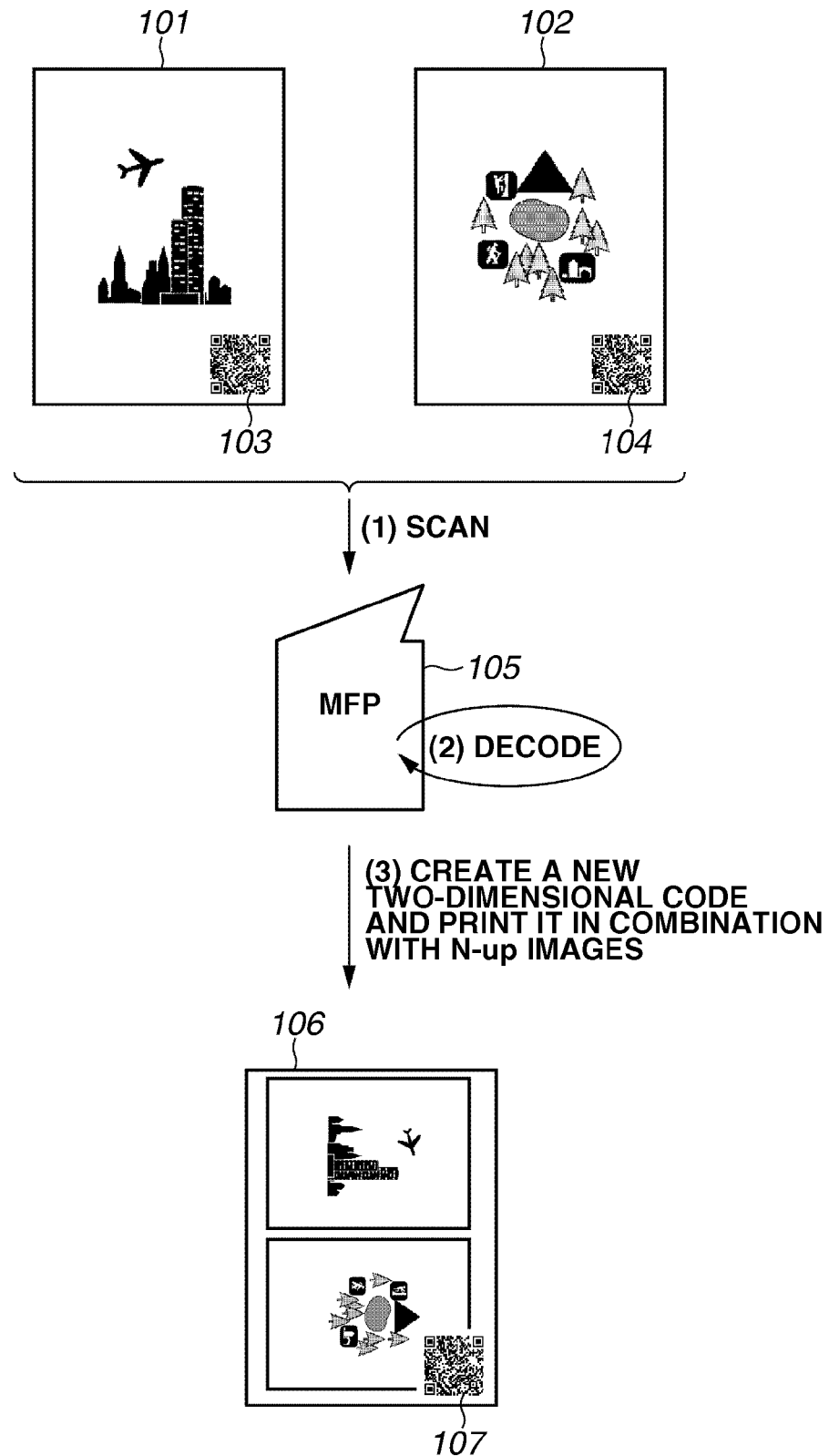
FIG. 1 is a system diagram.

FIG. 1 is a system diagram according to a first exemplary embodiment. This system includes only a multifunctional printer (MFP) 105 as an image forming apparatus. It is not limited to the MFP. In lieu of the MFP, any image forming apparatus that can form an image on a memory or paper can be used.

On a document 101, an image and a two-dimensional code 103 containing information about the document 101 are printed. Similarly, on a document 102, an image and a two-dimensional code 104 containing information about the document 102 are printed.

A user sets a number of documents on the document positioning plate, and instructs the MFP 105 to make a copy with a setting such that the images of N (N is an integer of 2 or greater) pieces of documents are reduced in a size and combined on the same page uniformly (hereinafter referred to as N-up setting).

The MFP 105 scans the documents 101 and 102, to detect and decode the two-dimensional codes 103 and 104 contained in the documents 101 and 102 respectively.

An example of information contained in the two-dimensional code printed on the document includes information about security of a document such as whether copying of the document is restricted or permitted or whether copying of the document is permitted only when conditions such as password or log-in user are met. Hereinafter, such information is called "security information." Security information is not limited to information about copying permission/restriction but may be any information relevant to document security. For example, information about scanning permission/restriction, information about permission/restriction of transmission of the document data to the outside, or information about permission/restriction of storage of the document data into a memory of a MFP.

Further, information for tracking a person who gave instructions to output (i.e., production) of a print is required. Such information is hereinafter termed tracking information. While a document is paper to be scanned, an output print is paper on which certain information is printed. If the output print is scanned, this output print serves as the document and, therefore, there is no substantial difference between the document and the output print.

Such tracking information includes, for example, a name of a user who gave instructions to production of a print (User Name), a serial number of the image forming apparatus (Serial No.), the time at which the print is output (Time), and a name of the manufacturer of the image forming apparatus (Vendor).

Not only the name of a user but also these other pieces of information may indirectly be helpful in tracking users who have given instructions to the output of prints. Therefore, they are also included in the tracking information in the present exemplary embodiment and other embodiments.

In the exemplary embodiment, there are these two types of information contained in the two-dimensional code. The size of the two-dimensional code that can include these two types of information (i.e., two pieces of information in total) is predetermined.

In step S1002, the MFP 105 detects only the two-dimensional code that has this specified size.

By decoding the two-dimensional codes, it is possible to extract information contained in these two-dimensional codes. Based on instructions set (in the MFP 105) by a user or supervisor in advance, the MFP 105 determines the information required to be included in an output print 106. The MFP 105 then encodes the information determined to be included in the print.

The two-dimensional code 107 thus created is combined with the images reduced based on the N-up setting and thus a print 106 is output.

Consequently, the two-dimensional code 107 of the output print 106 takes over minimum necessary information which is selected from among the two-dimensional codes of both the documents 101 and 102.

Next, the definitions of the terms "decode" and "encode" used in the present exemplary embodiment will be described with reference to FIGS. 3 and 4.

FIG. 3 illustrates a list of information contained in a two-dimensional code. For example, security information for "copy permission" is contained in the two-dimensional code as command information in a tag format, i.e., "Security: copy_ok" described on it.

Figure 4:
FIG. 4 is an example of a two-dimensional code according to the first exemplary embodiment.

FIG. 4 illustrates a two-dimensional code into which the command information in the tag format illustrated in FIG. 3 is converted.

The term "decode" means extracting information (e.g., information illustrated in FIG. 3) from a code such as a one-dimensional code, a two-dimensional code, or a digital watermark. The term "encode" means creating a code from information contained in the code.

The foregoing is the definition of "decode" and "encode" used in the present exemplary embodiment. Processing in the present exemplary embodiment and other embodiments will be described using the two-dimensional code as an example. It can be easily understood by those skilled in the art that the processing can also be applicable to, for example, a one-dimensional code or digital watermark as well as the two-dimensional code.

A processing flow according to the first exemplary embodiment will now be described with reference to the flowchart illustrated in FIG. 2.

After a user enters an N-up setting instruction on an operation screen, the MFP 105 can respond to the depression of a start button for initiating copying.

Figure 2:
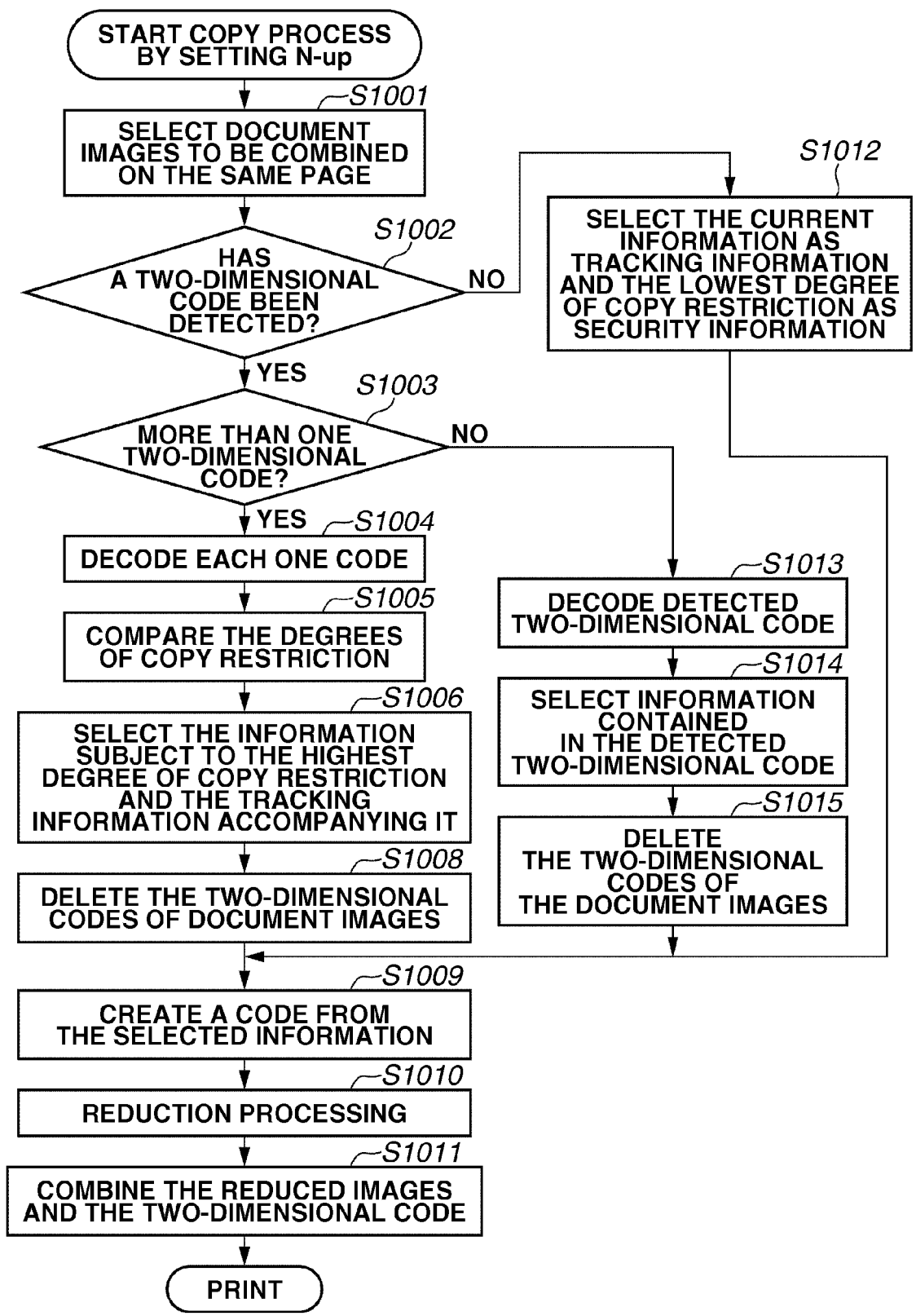
FIG. 2 illustrates a flowchart according to a first exemplary embodiment.

Processing according to the flowchart in FIG. 2 is initiated after the MFP 105 sets N-up setting based on the N-up setting instruction given by the user and the start button of the MFP 105 is depressed.

The central processing unit (CPU) of the MFP 105 comprehensively controls and executes the processes from step S1001 to step S1015 in the flowchart illustrated in FIG. 2.

In step S1001, the MFP 105 scans L pieces of documents on the document positioning plate and forms electric signals of document images. The document positioning plate includes ADF (Auto Document Feeder). When the document positioning plate is the ADF, the MFP scans L pieces of document one by one.

Since the MFP 105 has been set to the N-up in this case, it is assumed that the number of documents placed on the document positioning plate is L (L is an integer of N or greater).

In step S1001, from among images formed by L pieces of documents in step S1001, the MFP 105 selects N pieces of document images which are to be combined on the same page when outputting, and proceeds to step S1002.

For example, where seven documents are placed on the document positioning plate, and the documents are scanned in a 4-up setting, the first, second, third, and fourth document images are selected as one set, and the fifth, sixth, and seventh document images are selected as another set.

In step S1002, it is determined whether a two-dimensional code has been detected in each of the document images selected in step S1001.

If no two-dimensional code has been detected in step S1002, the process advances to step S1012.

In step S1012, information with the lowest level of copy restriction (e.g., information indicating copy permission) among the security information that can be set in the MFP 105 is selected as security information.

While, in step S1012, the security information with the lowest level of copy restriction is automatically selected, a user may select security information from among security information that can be set in the MFP 105.

In addition, as tracking information, the MFP 105 selects the current information (which includes the name of a user who has given instructions to output of a print, the serial number of the image forming apparatus, the time at which the print is output, and the manufacturer of the image forming apparatus).

Since the number of pieces of security information and the number of pieces of tracking information are both limited to one, these pieces of information can fit within a code of normal size.

If the two-dimensional code is detected in step S1012, the process advances to step S1003.

In step S1003, a determination is made as to whether the number of the two-dimensional codes detected in step S1002 is more than one.

If the number of the two-dimensional codes detected in step S1003 is not more than one, the MFP 105 proceeds to step S1013, where it decodes the detected a single two-dimensional code to obtain information contained in the single two-dimensional code, and then proceeds to step S1014. In addition, the following processing should be preferably performed between step S1014 and step S1015. The processing includes judging whether the obtained information includes copy inhibition or not and inhibiting to print the N pieces of the document images when the obtained information includes copy inhibition.

In step S1014, the MFP 105 selects security information and tracking information contained in the two-dimensional codes and proceeds to step S1015. The security information and tracking information are each limited to one piece, thereby they can fit in a code of normal size.

In step S1015, only that two-dimensional code contained in the document image is deleted.

On the other hand, where more than one two-dimensional code is detected in step S1003, the MFP 105 proceeds to step S1004.

In step S1004, the MFP 105 decodes each of the two-dimensional codes contained in the document images (i.e., all the two-dimensional codes detected in step S1002) one by one and extracts(obtaines) information contained in the two-dimensional codes. After this extraction, the MFP 105 proceeds to step S1005. In addition, the following processing should be preferably performed between step S1004 and step S1005. The processing includes judging whether the obtained information includes copy inhibition or not and inhibiting to print the N pieces of the document images when the obtained information includes copy inhibition.

In step S1005, the MFP 105 compares the set security levels (i.e., the level of copy restriction in the present exemplary embodiment) among the information obtained as a result of decoding in step S1004, with the security information set in the MFP 105. Then, the MFP 105 proceeds to step S1006.

As to three levels, copy permission, conditional copy permission, and copy inhibition, the level of copy restriction naturally increases in that order.

The present exemplary embodiment has been described using the level of copy restriction as a security level. However, any security levels may be employed as long as there are differences between them. The security information includes, for example, the level of scan restriction, the restriction level of image data transmission to the outside, and the restriction level against storage of image data onto an hard disk drive (HDD) in the MFP.

For example, it is assumed that when two documents are scanned in a 2-up setting, the first and second document contain, as two-dimensional codes, information about copy permission, and information about copy permission with a password, respectively.

In this case, the security information at the highest security level (i.e., in the present exemplary embodiment, the level of copy restriction) selected in step S1006 is not the unconditional copy permission but the copy permission with a password, which may be performed only by a user knowing the password.

In step S1006, the MFP 105 selects security information at the highest security level as a result of the comparison in step S1005. It also selects the tracking information accompanying the selected security information (i.e., the tracking information contained in the same two-dimensional code as the security information at the highest security level).

The reason for selecting the tracking information accompanying the security information at the highest security level is based on the following: a user that outputs a print with a high level of copy restriction has to be responsible for the management of the output print. Accordingly, even if a size of the images is reduced on the print by the N-up setting, the user who outputs the print remains responsible for the security.

Accordingly, N-up copying (i.e., copying at N-up setting) requires the selection of tracking information to find who has output a print with security information that has a high level of copy restriction.

Suppose, for example, that there are two documents. one is a copy-permission document printed using MFP 1051 according to an instruction from a user A at the time 20xx/yy/zz, and another is a copy-permission document requiring a password created in the MFP 1052 by a user B at the time 20aa/bb/cc. Suppose further that a user C gives an instruction to copying of the two documents at a 2-up setting. The first one is a copy permission document, which contains security information that permits copying, as a two-dimensional code. The second one is a copy permission document requiring a password, which contains, as a two-dimensional code, security information that permits copying only when the password is entered.

In this case, the security information determined to be highest in security level (i.e., the level of copy restriction) in step S1006 is the information that permits copying with a password, which has been contained in the second document.

Consequently, the print output by the user C will be given, as two-dimensional codes, the security information that permits copying with a password, together with the tracking information such as the time 20zz/bb/cc, the user B, and the MFP 1052.

If the security levels compared in step S1005 are the same, the same security level contained in the documents is selected as the security level added when the print is output.

Suppose, for example, that there are two documents and one is a document with permission to copy using MFP 1061, which is produced according to an instruction from a user D at the time 20uu/vv/ww, and another is a document with permission to copy using MFP 1062, which is produced according an instruction from a user E at the time 20dd/ee/ff. Further, suppose that a user F has given an instruction to copying of the two documents at a 2-up setting.

The first one is a document that contains, as a two-dimensional code, security information that permits copying, and the second one is also a document that contains, as a two-dimensional code, security information that permits copying.

In this case, the security information determined to be highest in security level in step S1006 is the information that permits copying, which are contained in both the first and second documents.

The tracking information selected from among the first and second documents at this time is the older one (or the oldest one).

The reason for selecting the oldest information is based on the following principle: a user who has output a print at a high security level has to be basically responsible for the management of the output print and takes over information specifying a user who has output a print at a high security level.

If the security levels are the same, a user who has output a print at a high security level earlier than other users who have output the same print is specified. This makes it easy to identify a user who leaked information first and also to specify the leakage source who has produced the paper medium.

Therefore, as a two-dimensional code, security information that permits copying and tracking information, namely, time 20dd/ee/ff, user E, and MFP 1062, are added to a print output for the user F.

Suppose, for example, that there are two documents and one is a document with permission to copy using MFP 1071 which was produced according to an instruction from a user G at the time 20rr/ss/tt, and another a document with permission to copy using MFP 1072 which was produced according an instruction from a user H at the time 20gg/hh/ii. Further suppose that a user I gives an instruction to copying of these two documents at a 2-up setting.

The first one is a document that contains, as a two-dimensional code, security information that permits copying with a password, and the second one is also a document that contains, as a two-dimensional code, security information that permits copying with a password. Suppose that a user F gives an instruction to copying of these two documents at a 2-up setting.

In this case, the security information determined to be highest in step S1006 is the information that permits copying with a password, which has been contained in both the first and second documents.

In this case, the password taken over by the output print is the one accompanying the older tracking information selected from among the first and second documents. This is based on the principle that the oldest information is the most important, which has already been referred to above.

For the same reason, the tracking information selected at this time is the oldest one.

Consequently, as a two-dimensional code, security information that permits copying with a password (which has been set by the user H) and tracking information, namely, time 20gg/hh/ii, user H, and MFP 1072, are added to a print output by the user I.

In step S1008, the MFP 105 whitens the areas of the two-dimensional codes in the document images, thereby deleting the two-dimensional codes. This process is performed for all document images containing two-dimensional codes.

In the present embodiment and other embodiments, to whiten the areas of two-dimensional codes means resetting the values of pixels in the given areas to 0 (i.e., each pixel is changed to white).

When the two-dimensional codes in the documents are deleted in such a manner, it is possible to output a print that has thereon a two-dimensional code containing only required information. Accordingly, time taken in detecting, for example, a two-dimensional code or decoding information is reduced.

After the MFP 105 deletes the unnecessary two-dimensional codes of the document images, the MFP 105 proceeds to step S1009.

In step S1009, the MFP 105 creates a new two-dimensional code based on information selected in steps S1006, 1012, and 1014.

At this time, the MFP 105 encodes the information to create a two-dimensional code of the normal size same as the two-dimensional code added to each of the scanned documents 101 and 102. Because the number of pieces of security information and of tracking information are each limited to one in step S1006, the two-dimensional code can be created in the size same as the two-dimensional code added to each scanned document 101, 102.

Alternatively, this is because only one piece of current security information and only one piece of tracking information are selected in step S1012.

Alternatively, it is because only one piece of security information and only one piece of tracking information which are contained in the single security code are selected in step S1014.

As described above, in the present exemplary embodiment and other embodiments, when only one piece of security information and only one piece of tracking information are selected, a two-dimensional code containing these pieces of information can fit into the normal size referred to above.

When the number of pieces of information is less than two (i.e., only security information or tracking information), a two-dimensional code containing the information naturally fits into the normal size.

In the present exemplary embodiment and other embodiments, one piece of tracking information does not mean the name of a user (User Name) only or serial number (Serial No.) only.

Tracking information includes the name of a user (User Name), the serial number of an image forming apparatus (Serial No.), the time at which a print is output (Time), and the name of the manufacturer of the image forming apparatus (Vendor), all of which are grouped as one set.

In step S1010, the MFP 105 reduces the size of N pieces of image documents to meet the N-up setting and allocate the reduced images to the image area on one sheet of paper. As a result, a new sheet of document images are obtained. After this allocation is completed, the MFP 105 proceeds to step S1011.

In step S1011, the document images for the new sheet obtained in step S1010, and the two-dimensional code created in step S1009, are combined. Hereinafter, these combined images are termed "output image data." Thus, the two-dimensional code is contained in the output image.

Thereafter, only when copying is permitted, the MFP 105 prints this output image data as an output print.

Whether copying is permitted is determined based on the information that has the highest security level among the security information contained in N pieces of image documents selected in S1001. For example, when the information with the highest security level is information that permits copying with a password, the MFP 105 urges a user to enter the password. Then, the MFP 105 determines whether the password is correct. If the password is correct, copying is permitted, and if not, it is inhibited.

The area where the document images and the two-dimensional code of normal size are combined is predetermined. For example, the two-dimensional code of normal size is created in an area that is, for example, within 5 cm from the end of paper.

This does not mean that the two-dimensional code is created in a size occupying all the predetermined area but means that a two-dimensional code of normal size is created to fit within the predetermined area.

This is because the speed at which a two-dimensional code is detected increases by focusing on a predetermined area of paper and detecting whether this area carries the two-dimensional code, rather than by detecting where a two-dimensional code is located on each document every time such a document is scanned.

In the foregoing example, three levels of security information, namely, permission, conditional permission, and copy inhibition, were described.

However, in future it may become necessary to set more levels of copy restriction. In such a case, a rank order of copy restriction level has to be set in the MFP 105 in advance by a supervisor or user of the MFP 105.

An example of a method for setting a rank of copy restriction level will now be described using FIG. 5.

Using the MFP 105, a supervisor or user sets the rank order of copy restriction levels.

Figure 5:
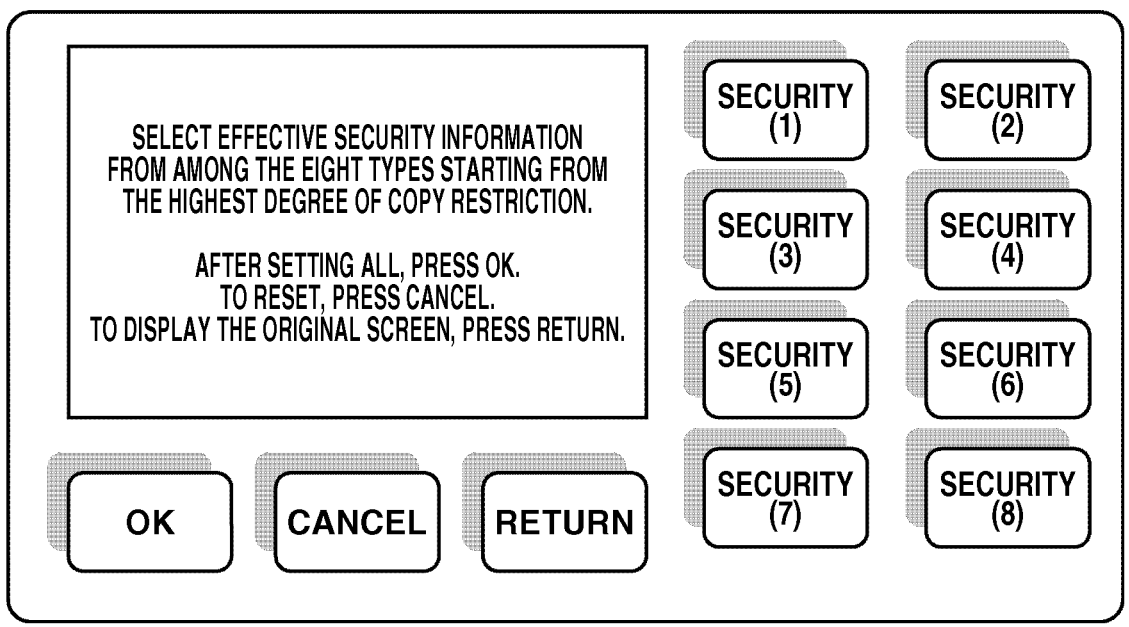
FIG. 5 is a diagram illustrating an example of a display area according to the first exemplary embodiment when security levels are set.

As illustrated in FIG. 5, the display area of the setting screen shows all levels of copy restriction.

Figure 6:
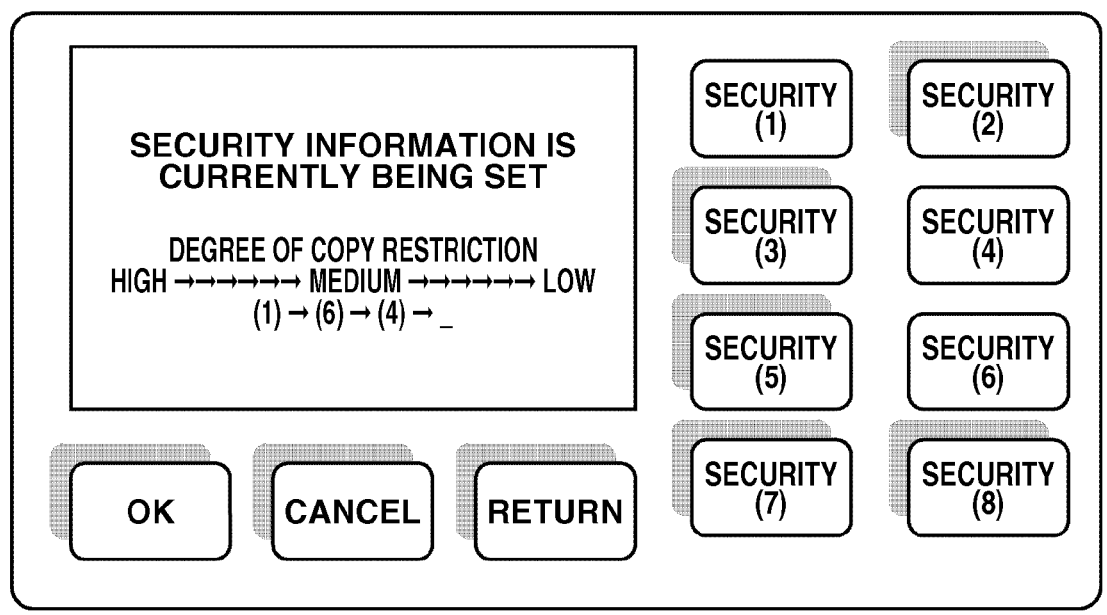
FIG. 6 is a diagram illustrating another example of the display area according to the first exemplary embodiment when security levels are set.
Figure 7:
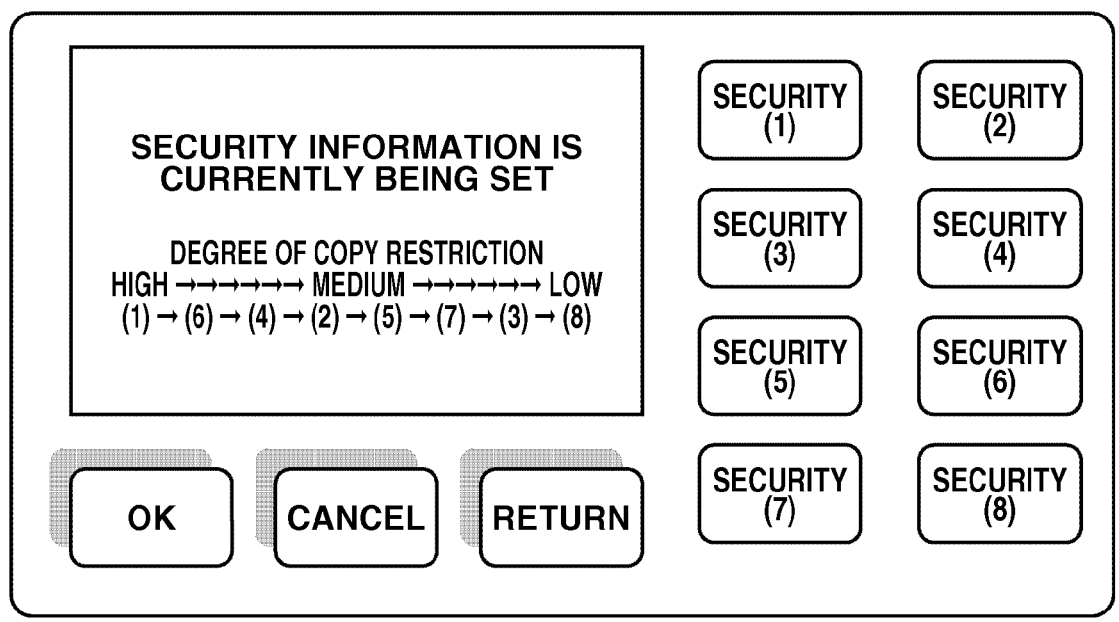
FIG. 7 is a diagram illustrating an example of a display area according to the first exemplary embodiment, when security levels are set.

Following the indications on the display area, buttons corresponding to the levels of copy restriction are depressed from the highest level, as illustrated in FIG. 6. Thereby, as illustrated in FIG. 7, all the levels of copy restriction are set in order of selection.

When the MFP 105 is set in advance in the manner described above, in step S1005, it becomes possible to select appropriate security information.

As above described, in step S1006, security information with the highest security level and tracking information contained in the same two-dimensional code are selected as an example.

However, security information and tracking information do not have to be taken over in combination by an output print. For example, the oldest or latest information may be taken over by the output print. Alternatively, information relevant to the output printed this time may be taken over by the output print as tracking information.

A user or supervisor may make a choice and set tracking information in the MFP 105 in advance, thereby enabling the selection of appropriate tracking information in step S1006.

The above description was an example where, in step S1009, selected information is added to an output print by creating a new two-dimensional code of the same size as that of the two-dimensional code added to the original document images.

However, in the same position where a two-dimensional code has been added to the original document, a new two-dimensional code can be created in a same reduced size as the document image.

Figure 8:
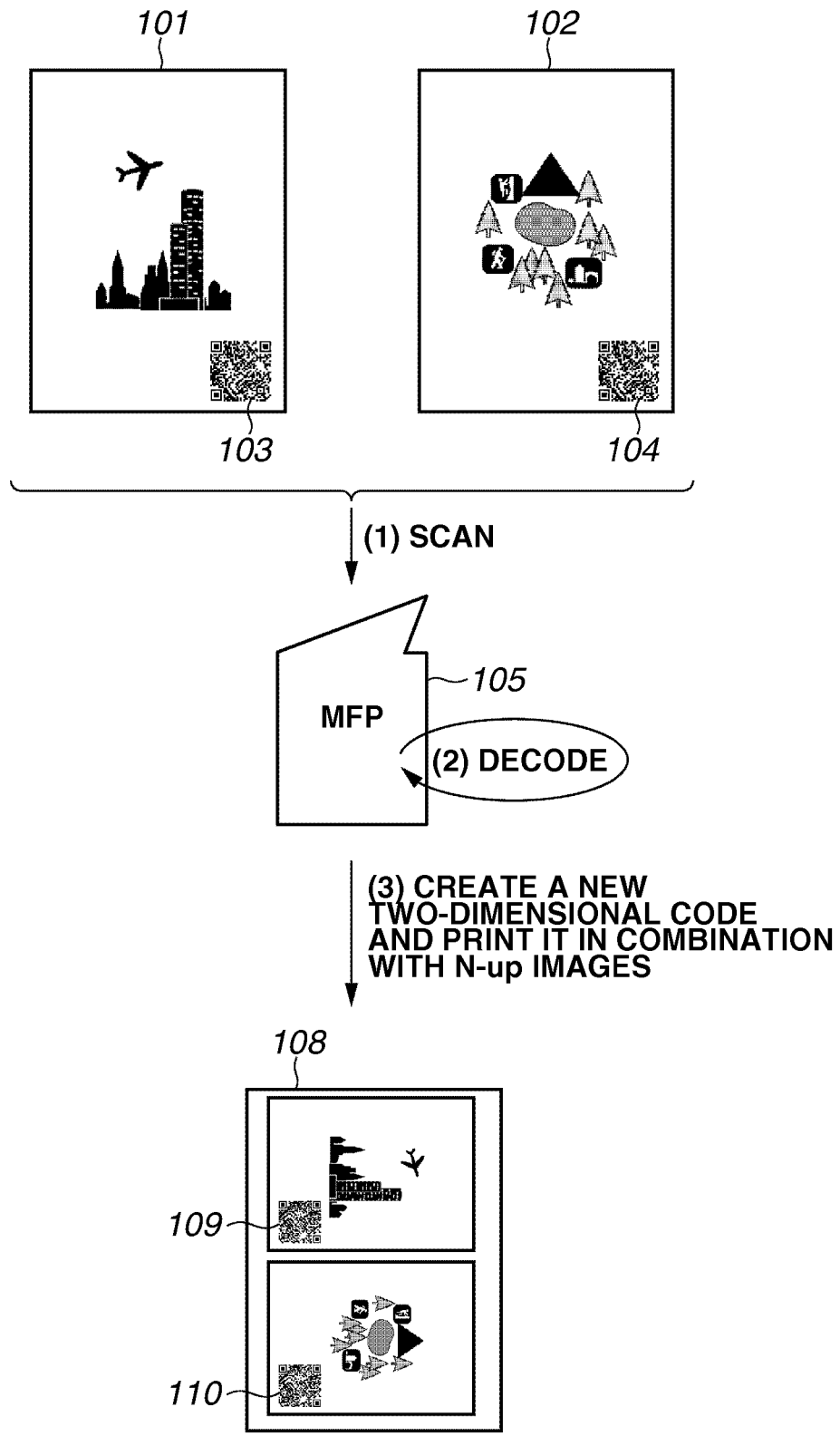
FIG. 8 is a system diagram in which two-dimensional codes according to the first exemplary embodiment are created in a same reduced size as the documents, and the two-dimensional codes thus created are located in the same position as in the original documents.

In this case, since the size of the two-dimensional code is reduced, the amount of information that can be encoded decreases. To address this drawback, the selected security information and tracking information are each divided into N pieces of smaller two-dimensional codes. More specifically, smaller two-dimensional codes whose areas are 1/N of the normal size are added to N pieces of corresponding document images reduced in a size (i.e., to approximately 1/N of the respective original areas in terms of area) in one output print. In such a case, when a print is output at a 2-up setting as illustrated in FIG. 8, each of the smaller two-dimensional codes 109 and 110 is added to the same position as the original document.

The above description was an example where, in step S1002, only a two-dimensional code of normal size is detected from a document, where a change in the size of a two-dimensional code can be permitted as described above. However, the normal size also includes a two-dimensional code reduced in a size that can be set at an N-up setting.

In such a case, the two-dimensional code 109 of the first document image contains security information selected in step S1006, and the two-dimensional code 110 of the second document image contains tracking information selected in step S1011.

In this case, information that associates the two-dimensional codes 109 and 110 with each other may be encoded in these codes so that accurate information can be extracted only when both the codes are decoded.

Figure 9:
FIG. 9 illustrates an example of a tag in which when two-dimensional codes according to the first exemplary embodiment are created in a same reduced size as the documents, associating information is added to the two-dimensional codes.
Figure 10:
FIG. 10 illustrates another example of a tag in which when two-dimensional codes according to the first exemplary embodiment are created in a same reduced size as the documents, associating information is added to the two-dimensional codes.

FIGS. 9 and 10 illustrate pieces of tag information that associate two-dimensional codes with each other, and examples of two-dimensional codes created based on these tag information.

The information that associate one two-dimensional code with another two-dimensional code has been converted to command information in a tag form, such as "Code Status: 1/2" and "Code status: 2/2."

Even where either one of the two-dimensional codes is decoded, the MFP 105 does not recognize, owing to the association information, that the information is correctly extracted, and exerts control to prevent copying.

In the exemplary embodiment and the other embodiments described above, a description was given using a memory as a means for storing data. However, any medium, such as a HDD or random access memory (RAM), which can store data may be used.

The exemplary embodiment and the other embodiments were described assuming that a MFP scans a document. However, instead of scanning, any method for optically reading document images may be adopted.

For example, the embodiment of the present invention is feasible even where images are captured by photography with a digital camera.

The above exemplary embodiment and the other embodiments were described using a MFP that can read image, extract/select information, and print images on sheets. However, separate devices may read images, perform the process of each step in FIG. 2, and print images on sheets.

In this specification, any device that can perform a process corresponding to at least one of the steps illustrated in FIG. 2 is termed "an image processing device."

Also, any device that can perform a process corresponding to even one step illustrated in FIG. 2 and can print images on sheets is termed "an image forming apparatus."

In addition, the present invention can also be embodied by a computer that can read and execute a program code (stored in a recording medium) provided to realize the procedure of the flowchart described in the exemplary embodiment and the other embodiments described above.

In this case, the program code read from the recording medium realizes the function of the exemplary embodiment described above. Accordingly, the program code and a recording medium stored in the program code can also constitute the present invention. The program code has to be read from a recording medium. The recording medium for supplying the program code may be, for example, a flexible disk, hard disk, optical disk, optical magnetic disk, compact disk read only memory (CD-ROM), compact disk recordable (CD-R), magnetic tape, nonvolatile memory card, or read only memory (ROM).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   a reading unit configured to read a first document including a first two-dimensional code and a second document including a second two-dimensional code;
   a decoding unit configured to decode the first two-dimensional code and the second two-dimensional code in image data obtained by the reading;
   a selecting unit configured to select security information having a higher security level from security information obtained by the decoding of the first two-dimensional code and security information obtained by the decoding of the second two-dimensional code;
   a generating unit configured to generate a third two-dimensional code based on the selected security information having the higher security level;
   a combining unit configured to combine the generated third two-dimensional code with the image data; and
   an outputting unit configured to output a result obtained by the combining.

2. The apparatus according to claim 1, wherein the outputting unit outputs the result obtained by the combining on a sheet of paper.

3. The apparatus according to claim 1, wherein the generating unit generates the third two-dimensional code including the security information selected from the security information obtained by the decoding of the first two-dimensional code and the security information obtained by the decoding of the second two-dimensional code but not including the unselected security information.

4. The apparatus according to claim 3, further comprising: a deletion unit configured to delete the two-dimensional code including the unselected security information from the image data prior to the combining by the combining unit.

5. The apparatus according to claim 1, further comprising: a deletion unit configured to delete the two-dimensional code including the selected security information from the image data prior to the combining by the combining unit.

6. The apparatus according to claim 1,
wherein the selecting unit compares security levels of the security information obtained by the decoding of the first two-dimensional code and the security information obtained by the decoding of the second two-dimensional code and selects the security information having the higher security level.

7. An apparatus comprising:
a reading unit configured to read a first document including a first two-dimensional code and a second document including a second two-dimensional code;
a decoding unit configured to decode the first two-dimensional code and the second two-dimensional code in image data obtained by the reading;
a selecting unit configured to select older tracking information from tracking information obtained by the decoding of the first two-dimensional code and tracking information obtained by the decoding of the second two-dimensional code;
a generating unit configured to generate a third two-dimensional code based on the selected tracking information;
a combining unit configured to combine the generated third two-dimensional code with the image data; and
an outputting unit configured to output a result obtained by the combining.

8. The apparatus according to claim 7, wherein the outputting unit outputs the result obtained by the combining on a sheet of paper.

9. The apparatus according to claim 7, wherein the generating unit generates the third two-dimensional code including the tracking information selected from the tracking information obtained by the decoding of the first two-dimensional code and the tracking information obtained by the decoding of the second two-dimensional code but not including the unselected tracking information.

10. The apparatus according to claim 9, further comprising: a deletion unit configured to delete the two-dimensional code including the unselected tracking information from the image data prior to the combining by the combining unit.

11. The apparatus according to claim 7, further comprising: a deletion unit configured to delete the two-dimensional code including the selected tracking information from the image data prior to the combining by the combining unit.

12. The apparatus according to claim 7, wherein the first two-dimensional code and the second two-dimensional code includes security information having the same security level.

13. The apparatus according to claim 7, wherein tracking information indicates a user who has instructed to print a document.

14. A method comprising:
reading a first document including a first two-dimensional code and a second document including a second two-dimensional code;
decoding the first two-dimensional code and the second two-dimensional code in image data obtained by the reading;
selecting security information having a higher security level from security information obtained by the decoding of the first two-dimensional code and security information obtained by the decoding of the second two-dimensional code;
generating a third two-dimensional code based on the selected security information having the higher security level;
combining the generated third two-dimensional code with the image data; and
outputting a result obtained by the combining.

15. The method according to claim 14, wherein the outputting step outputs the result obtained by the combining on a sheet of paper.

16. The method according to claim 14, wherein the generating step generates the third two-dimensional code including the security information selected from the security information obtained by the decoding of the first two-dimensional code and the security information obtained by the decoding of the second two-dimensional code but not including the unselected security information.

17. The method according to claim 16, further comprising: deleting the two-dimensional code including the unselected security information from the image data prior to the combining by the combining step.

18. The method according to claim 14, further comprising: deleting the two-dimensional code including the selected security information from the image data prior to the combining by the combining step.

19. The method according to claim 14,
wherein the selecting step compares security levels of the security information obtained by the decoding of the first two-dimensional code and the security information obtained by the decoding of the second two-dimensional code and selects the security information having the higher security level.

20. A method comprising:
reading a first document including a first two-dimensional code and a second document including a second two-dimensional code;
decoding the first two-dimensional code and the second two-dimensional code in image data obtained by the reading;
selecting older tracking information from tracking information obtained by the decoding of the first two-dimensional code and tracking information obtained by the decoding of the second two-dimensional code;
generating a third two-dimensional code based on the selected tracking information;
combining the generated third two-dimensional code with the image data; and
outputting a result obtained by the combining.

21. The method according to claim 20, wherein the outputting step outputs the result obtained by the combining on a sheet of paper.

22. The method according to claim 20, wherein the generating step generates the third two-dimensional code including the tracking information selected from the tracking information obtained by the decoding of the first two-dimensional code and the tracking information obtained by the decoding of the second two-dimensional code but not including the unselected tracking information.

23. The method according to claim 22, further comprising: deleting the two-dimensional code including the unselected tracking information from the image data prior to the combining by the combining step.

24. The method according to claim 20, further comprising: deleting the two-dimensional code including the selected tracking information from the image data prior to the combining by the combining step.

25. The method according to claim 20, wherein the first two-dimensional code and the second two-dimensional code includes security information having the same security level.

26. The method according to claim 20, wherein tracking information indicates a user who has instructed to print a document.

27. A computer-readable storage medium storing a control program, which when loaded into a computer and executed performs a method comprising:
- reading a first document including a first two-dimensional code and a second document including a second two-dimensional code;
- decoding the first two-dimensional code and the second two-dimensional code in image data obtained by the reading;
- selecting security information having a higher security level from security information obtained by the decoding of the first two-dimensional code and security information obtained by the decoding of the second two-dimensional code;
- generating a third two-dimensional code based on the selected security information having the higher security level;
- combining the generated third two-dimensional code with the image data; and
- outputting a result obtained by the combining.

28. A computer-readable storage medium storing a control program, which when loaded into a computer and executed performs a method comprising:
- reading a first document including a first two-dimensional code and a second document including a second two-dimensional code;
- decoding the first two-dimensional code and the second two-dimensional code in image data obtained by the reading;
- selecting older tracking information from tracking information obtained by the decoding of the first two-dimensional code and tracking information obtained by the decoding of the second two-dimensional code;
- generating a third two-dimensional code based on the selected tracking information;
- combining the generated third two-dimensional code with the image data; and
- outputting a result obtained by the combining.

* * * * *